(12) United States Patent
Yamaguchi (10) Patent No.: US 10,473,077 B2
(45) Date of Patent: Nov. 12, 2019

(54) CONTROL DEVICE FOR HIGH-PRESSURE PUMP (71) Applicant: DENSO CORPORATION, Kariya, Aichi-pref. (JP)

(72) Inventor: Hiroshi Yamaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 68 days.

(21) Appl. No.: 15/766,949

(22) PCT Filed: Oct. 14, 2016

(86) PCT No.: PCT/JP2016/080506
§ 371 (c)(1),
(2) Date: Apr. 9, 2018

(87) PCT Pub. No.: WO2017/069052
PCT Pub. Date: Apr. 27, 2017

(65) Prior Publication Data
US 2018/0291852 A1  Oct. 11, 2018

(30) Foreign Application Priority Data

Oct. 22, 2015  (JP) ................................. 2015-208341

(51) Int. Cl.
*F02M 59/34*   (2006.01)
*F02M 59/20*   (2006.01)
(Continued)

(52) U.S. Cl.
CPC ......... *F02M 59/34* (2013.01); *F02D 41/3845* (2013.01); *F02D 41/406* (2013.01);
(Continued)

(58) Field of Classification Search
CPC ...... F02M 59/34; F02M 59/366; F02M 59/20; F02M 2200/09; F02D 41/3845; F02D 41/406; Y02T 10/44
See application file for complete search history.

(56) References Cited

U.S. PATENT DOCUMENTS

2005/0092301 A1* 5/2005 Fukuda ................ F02M 59/366
123/446
2005/0193982 A1* 9/2005 Sakai .................. F02D 41/3094
123/431
(Continued)

FOREIGN PATENT DOCUMENTS

JP  2015-2142   1/2015
JP  2015-14221  1/2015
JP  2015-17553  1/2015

*Primary Examiner* — Joseph J Dallo
(74) *Attorney, Agent, or Firm* — Nixon & Vanderhye P.C.

(57) ABSTRACT

A control device includes a control amount change part that changes an energization control amount of a control valve, an operation detection part that detects an operating condition of the control valve when the energization control amount is changed, a learning part that learns the energization control amount based on the operating condition of the control valve to reduce an operating noise of a high-pressure pump, and a determination part that determines whether or not an operating time of the control valve for the energization control amount is shorter than a time that allows for the detection of the operating condition of the control valve. The learning part prohibits the learning when the operating time of the control valve for the energization control amount is determined to be shorter than the time that allows for the detection of the operating condition of the control valve.

8 Claims, 8 Drawing Sheets

(51) Int. Cl.
  *F02M 59/36* (2006.01)
  *F02D 41/38* (2006.01)
  *F02D 41/40* (2006.01)
(52) U.S. Cl.
  CPC .......... *F02M 59/20* (2013.01); *F02M 59/366* (2013.01); *F02M 2200/09* (2013.01); *Y02T 10/44* (2013.01)

(56) References Cited

U.S. PATENT DOCUMENTS

| | | | | |
|---|---|---|---|---|
| 2006/0225695 | A1* | 10/2006 | Fukasawa | F02D 41/062 123/305 |
| 2006/0266327 | A1* | 11/2006 | Fukasawa | F02D 41/3845 123/305 |
| 2008/0035122 | A1* | 2/2008 | Thomas | F02D 41/0032 123/520 |
| 2009/0055082 | A1* | 2/2009 | Ikeda | F02D 41/3845 701/104 |
| 2009/0301439 | A1* | 12/2009 | Suzuki | F02D 41/2464 123/458 |
| 2009/0301441 | A1* | 12/2009 | Hasegawa | F02D 41/20 123/476 |
| 2013/0243608 | A1 | 9/2013 | Sakamoto | |
| 2015/0275816 | A1* | 10/2015 | Pursifull | F02D 41/3094 123/456 |
| 2016/0169147 | A1* | 6/2016 | Surnilla | F02D 41/2467 123/299 |
| 2016/0186682 | A1* | 6/2016 | Surnilla | F02D 41/3082 123/446 |
| 2016/0186741 | A1* | 6/2016 | Sakamoto | F02M 63/0049 417/290 |
| 2016/0363073 | A1* | 12/2016 | Han | F02D 41/182 |
| 2017/0082099 | A1* | 3/2017 | Takagawa | F02D 41/2464 |
| 2017/0363036 | A1* | 12/2017 | Okamoto | F02D 41/0085 |

\* cited by examiner

CONTROL DEVICE FOR HIGH-PRESSURE PUMP

CROSS REFERENCE TO RELATED APPLICATION

This application is the U.S. national phase of International Application No. PCT/JP2016/080506 filed on Oct. 14, 2016 which designated the U.S. and claims priority to Japanese Patent Application No. 2015-208341 filed on Oct. 22, 2015, the entire contents of each of which are incorporated herein by reference.

TECHNICAL FIELD

The present disclosure relates to a control device for a high-pressure pump.

BACKGROUND ART

In an existing fuel supply system for an internal combustion engine such as a gasoline engine or a diesel engine, there is known an in-cylinder injection fuel supply system, which includes a high-pressure pump that raises pressure of a low-pressure fuel drawn up from a fuel tank and an accumulator that accumulates the high-pressure fuel pressure-fed from the high-pressure pump, and directly injects the high-pressure fuel in the accumulator from an injector into a cylinder of the internal combustion engine. A known high-pressure pump includes a plunger that reciprocates in the cylinder, a pressurizing chamber into which fuel is introduced from a low-pressure side, and an electromagnetically driven control valve that adjusts a return amount of the fuel introduced into the pressurizing chamber. In an example of the high-pressure pump, the plunger reciprocates in the cylinder in accordance with rotation of a crankshaft, which is an output shaft of the internal combustion engine, to vary the capacity of the pressurizing chamber. The control valve is, for example, a normally open solenoid valve, in which a valving element is held at a valve-opening position by a spring during non-energization of a coil, thereby the fuel is allowed to enter from a low-pressure side passage into the pressurizing chamber. On the other hand, the valving element moves to a valve-closed position by the electromagnetic force of the coil during energization of the coil to shut off introduction of the fuel into the pressurizing chamber. In a capacity reduction stroke of the pressurizing chamber, while the valving element of the control valve is located at the valve-opening position, excess fuel is returned from the pressurizing chamber to the low-pressure side along with the movement of the plunger. Subsequently, the coil is energized so that the valving element is controlled at the valve-closed position, and thus the fuel in the pressurizing chamber is pressurized by the plunger and discharged to a high-pressure side. Thus, discharge amount control of the high-pressure pump is performed. In operation of the control valve, when the valving element collides with a stopper that is a movement limiting member, a collision noise may occur, leading to uncomfortable feeling of a vehicle passenger. An existing control device for a high-pressure pump, which can reduce such collision noise, includes a control device described in Patent Document 1. The control device described in Patent Document 1 detects operation of a valving element based on a change in drive current of the control valve when a drive signal is output to the control valve, and determines operation of the high-pressure pump based on the detection result. The control device controls the energization control amount of the control valve based on the determination result, and thus reduces the operating noise of the high-pressure pump.

PRIOR ART DOCUMENT

Patent Document

Patent Document 1: JP2015-45322A

In the internal combustion engine, the fuel injection amount of the injector decreases, for example, during idle operation or execution of fuel cut control as compared with the normal state. The decrease in the fuel injection amount of the injector reduces operating time of the high-pressure pump, more specifically, operating time of the control valve. In such a case, the control device reduces a drive signal output to the control valve, i.e., decreases the energization control amount, and thus reduces the operating time of the high-pressure pump. Such a reduction in the drive signal reduces the change in the drive current of the control valve based on the drive signal. As with the control device described in Patent Document 1, when the operating condition of the control valve is detected based on a change in drive current of the control valve, and if the drive signal is reduced, the control device may not detect the change in the drive current. This is a cause of erroneous detection of the operating condition of the control valve by the control device. If the control device erroneously detects the operating condition of the control valve, since the electric power supplied to the control valve cannot be appropriately controlled, the operating noise of the high-pressure pump may not be reduced.

SUMMARY OF INVENTION

The present disclosure addresses the above issues. Thus, it is an objective of the present disclosure to provide a control device for a high-pressure pump, which can more accurately reduce operating noise of the high-pressure pump.

To achieve the objective, a control device for a high-pressure pump in an aspect of the present disclosure adjusts a fuel discharge amount of the high-pressure pump by opening or closing a control valve through energization control. The control device includes a control amount change part, an operation detection part, a learning part, and a determination part. The control amount change part changes an energization control amount of the control valve. The operation detection part detects an operating condition of the control valve when the energization control amount is changed. The learning part learns the energization control amount based on the operating condition of the control valve to reduce an operating noise of the high-pressure pump. The determination part determines whether or not an operating time of the control valve for the energization control amount is shorter than a time that allows for the detection of the operating condition of the control valve. The learning part prohibits the learning when the operating time of the control valve for the energization control amount is determined to be shorter than the time that allows for the detection of the operating condition of the control valve.

According to this configuration, when the operating time of the control valve for the energization control amount is determined to be shorter than the time that allows for detection of the operating condition of the control valve, learning of the energization control amount by the learning part is prohibited, so that erroneous detection of the operating condition of the control valve can be avoided. As a result, since the learning accuracy of the energization control amount can be improved, the operating noise of the high-pressure pump can be more accurately reduced.

According to this aspect, the operating noise of the high-pressure pump can be more accurately reduced.

BRIEF DESCRIPTION OF DRAWINGS

The above and other objects, features and advantages of the present disclosure will become more apparent from the following detailed description made with reference to the accompanying drawings. In the drawings.

EMBODIMENT FOR CARRYING OUT INVENTION

Figure 1:
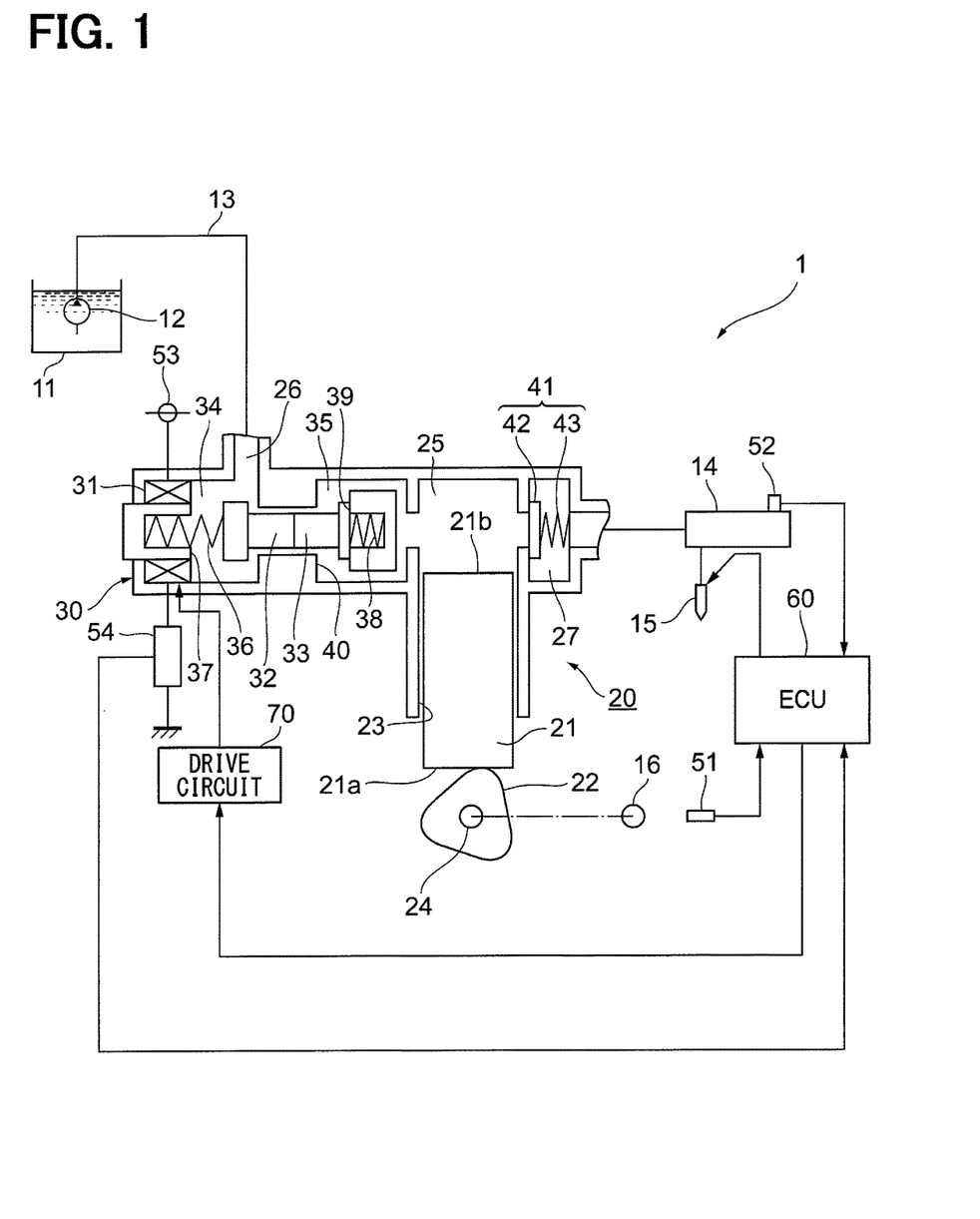
FIG. 1 is a block diagram illustrating a schematic configuration of a high-pressure pump of one embodiment.

Hereinafter, one embodiment of a control device for a high-pressure pump will be described. As shown in FIG. 1, a high-pressure pump 20 of the present embodiment is one element of a fuel supply system 1. The fuel supply system 1 supplies fuel to an in-cylinder injection vehicle-mounted gasoline engine that is an internal combustion engine. Specifically, the fuel supply system 1 has a fuel tank 11. The fuel stored in the fuel tank 11 is pumped up by a feed pump 12 that is an electromagnetically driven low-pressure pump, and is introduced into the high-pressure pump 20 through a low-pressure pipe 13. The fuel introduced into the high-pressure pump 20 is increased in pressure by the high-pressure pump 20, and then pressure-fed to an accumulator 14. The pressure-fed high-pressure fuel is accumulated in the accumulator 14 at a high pressure, and then directly injected into each cylinder of the engine from an injector 15 provided in the cylinder of the engine.

A structure of the high-pressure pump 20 is now described in detail. The high-pressure pump 20 is a so-called plunger pump that sucks and discharges the fuel along with movement of a plunger.

As shown in FIG. 1, the high-pressure pump 20 includes a plunger 21, a cam 22, and a control valve 30.

The plunger 21 is inserted in a cylinder 23 so as to reciprocate in an axial direction. One end 21a in the axial direction of the plunger 21 is in abutment with the cam 22 by biasing force of an undepicted spring. The cam 22 has a plurality of cam crests. The cam 22 is fixed to a camshaft 24 that rotates with rotation of a crankshaft 16 being an output shaft of the engine. As a result, when the crankshaft 16 rotates during engine operation, the plunger 21 moves in the cylinder 23 in the axial direction along with rotation of the cam 22.

The high-pressure pump 20 includes a pressurizing chamber 25, a fuel suction passage 26, and a fuel discharge passage 27. The pressurizing chamber 25 is disposed on the other end 21b of the plunger 21. The pressurizing chamber 25 is in communication with the fuel suction passage 26 and the fuel discharge passage 27. Fuel is introduced into or discharged from the pressurizing chamber 25 through the passage 26 or 27. Specifically, when the plunger 21 moves to a side such that the capacity of the pressurizing chamber 25 increases, that is, when the plunger 21 moves in a direction from the pressurizing chamber 25 to the cam 22, the low-pressure fuel in the low-pressure pipe 13 is introduced into the pressurizing chamber 25 through the fuel suction passage 26. When the plunger 21 moves to a side such that the capacity of the pressurizing chamber 25 decreases, that is, when the plunger 21 moves in a direction from the cam 22 to the pressurizing chamber 25, the fuel in the pressurizing chamber 25 is discharged to the fuel discharge passage 27.

The control valve 30 is disposed on the upstream side of the pressurizing chamber 25, i.e., at a fuel inlet portion of the high-pressure pump 20. The control valve 30 adjusts the fuel discharge amount of the high-pressure pump 20. The control valve 30 includes a coil 31 as an electromagnetic part, a first valving element 32, and a second valving element 33. The control valve 30 is configured as an on-off valve that displaces the first valving element 32 in the axial direction through energization control of the coil 31 to supply or shut off the fuel to the pressurizing chamber 25. The fuel suction passage 26 is provided within the control valve 30. The fuel suction passage 26 has a first valve chest 34 and a second valve chest 35 in order along a fuel flow direction.

The first valve chest 34 accommodates the first valving element 32. The first valving element 32 is displaced by energization or non-energization of the coil 31. During non-energization of the coil 31, the first valving element 32 is held at a valve-opening position by biasing force of a spring 36 as biasing means. During energization of the coil 31, the first valving element 32 is displaced to a valve-closed position, at which the first valving element 32 abuts on a stopper 37 against the biasing force of the spring 36. In this way, the stopper 37 serves as a movement limiting member that limits movement of the first valving element 32. A power supply 53 is connected to the input terminal side of the coil 31. Power is supplied from the power supply 53 to the coil 31.

The second valve chest 35 accommodates the second valving element 33. The second valving element 33 is disposed coaxially with the first valving element 32. The second valving element 33 is displaced along with movement of the first valving element 32. Specifically, when the first valving element 32 is at the valve-opening position, the second valving element 33 is pressed in the axial direction by the first valving element 32. As a result, the second valving element 33 is held at the valve-opening position at which the second valving element 33 abuts on a stopper 39 against biasing force of a spring 38. In this state, since the second valving element 33 is separate from a valve seat 40, the low-pressure pipe 13 communicates with the pressurizing chamber 25, and the low-pressure fuel is allowed to be introduced into the pressurizing chamber 25. On the other hand, when the first valving element 32 is at the valve-closed position along with energization of the coil 31, the second valving element 33 is released from the pressing by the first valving element 32 and thus held at the valve-closed position at which it is seated on the valve seat 40 by the biasing force of the spring 38. The communication between the low-pressure pipe 13 and the pressurizing chamber 25 is shut off in this state; hence, introduction of the low-pressure fuel into the pressurizing chamber 25 is also shut off.

The pressurizing chamber 25 is connected to the accumulator chamber 14 through the fuel discharge passage 27. A check valve 41 is provided in the middle of the fuel discharge passage 27. The check valve 41 includes a valving element 42 and a spring 43. The valving element 42 is displaced in the axial direction when the fuel pressure in the pressurizing chamber 25 becomes equal to or higher than a predetermined pressure. Specifically, when the fuel pressure in the pressurizing chamber 25 is lower than the predetermined pressure, the valving element 42 is held at the valve-closed position by the biasing force of the spring 43, resulting in shut-off of discharge of the fuel from the pressurizing chamber 25 to the fuel discharge passage 27. When the fuel pressure in the pressurizing chamber 25 is equal to or higher than the predetermined pressure, the valving element 42 is displaced against the biasing force of the spring 43 and the valve is opened, and thus the fuel is allowed to be discharged from the pressurizing chamber 25 to the fuel discharge passage 27.

The fuel supply system 1 includes various sensors such as a crank angle sensor 51, a fuel pressure sensor 52, and a current sensor 54. The crank angle sensor 51 outputs a rectangular crank angle signal at every predetermined crank angle of the engine. The fuel pressure sensor 52 detects the fuel pressure Pf in the accumulator 14. The current sensor 54 detects a drive current Ic of the coil 31. Hereinafter, the drive current Ic of the coil 31 is referred to as "coil drive current Ic".

The fuel supply system 1 includes an electronic control unit (ECU) 60. In the present embodiment, the ECU 60 corresponds to a control part. The ECU 60 is mainly configured of a microcomputer including a CPU, a storage device, and the like. Specifically, the ECU 60 acquires detection signals from the various sensors, and calculates control amounts of various parameters on engine operation based on the detection signals. The ECU 60 controls drive of the injector 15 or the control valve 30 based on the calculated values of the control amounts.

The ECU 60 performs the discharge amount control of the high-pressure pump 20, i.e., executes feedback control based on the deviation between the actual fuel pressure and the target fuel pressure so as to make the actual fuel pressure detected by the fuel pressure sensor 52 follow the target fuel pressure. As a result, the fuel pressure in the accumulator chamber 14 is controlled to the target fuel pressure corresponding to the operating condition of the engine.

Specifically, the ECU 60 controls the valve opening timing of the control valve 30 to adjust the fuel discharge amount of the high-pressure pump 20. More specifically, the ECU 60 is connected to the coil 31 of the control valve 30 via a drive circuit 70. The ECU 60 generates a drive signal corresponding to the energization control amount of the coil 31, and outputs the drive signal to the drive circuit 70 to control the opening and closing of the control valve 30. The energization control amount means a control command value indicating the magnitude of the current supplied to the coil 31.

When opening/closing of the control valve 30 is switched to discharge the fuel from the high-pressure pump 20, noise occurs by a collision of the first valving element 32 with the stopper 37, which may cause a passenger of the vehicle to feel uncomfortable. Such noise increases with an increase in electric energy applied to the coil 31. That is, as a larger electric energy is applied to the coil 31, moving speed of the first valving element 32 increases, so that a larger collision energy is generated when the first valving element 32 collides with the stopper 37, leading to a larger operating noise. Hence, when a smaller electric energy is applied to the coil 31 to slow the moving speed of the first valving element 32, it is possible to reduce the collision energy of the first valving element 32 and thus reduce the operating noise. The ECU 60 of the present embodiment therefore performs control to reduce the operating noise of the high-pressure pump 20 by slowing the speed at which the first valving element 32 moves toward the valve-closed position.

On the other hand, when the coil 31 is energized with a too small electric energy, the first valving element 32 cannot move toward the coil 31 during energization of the coil 31, and thus the control valve 30 cannot be switched to be closed. In such a case, the high-pressure pump 20 does not operate, and the fuel cannot be discharged from the high-pressure pump 20.

Figure 2:
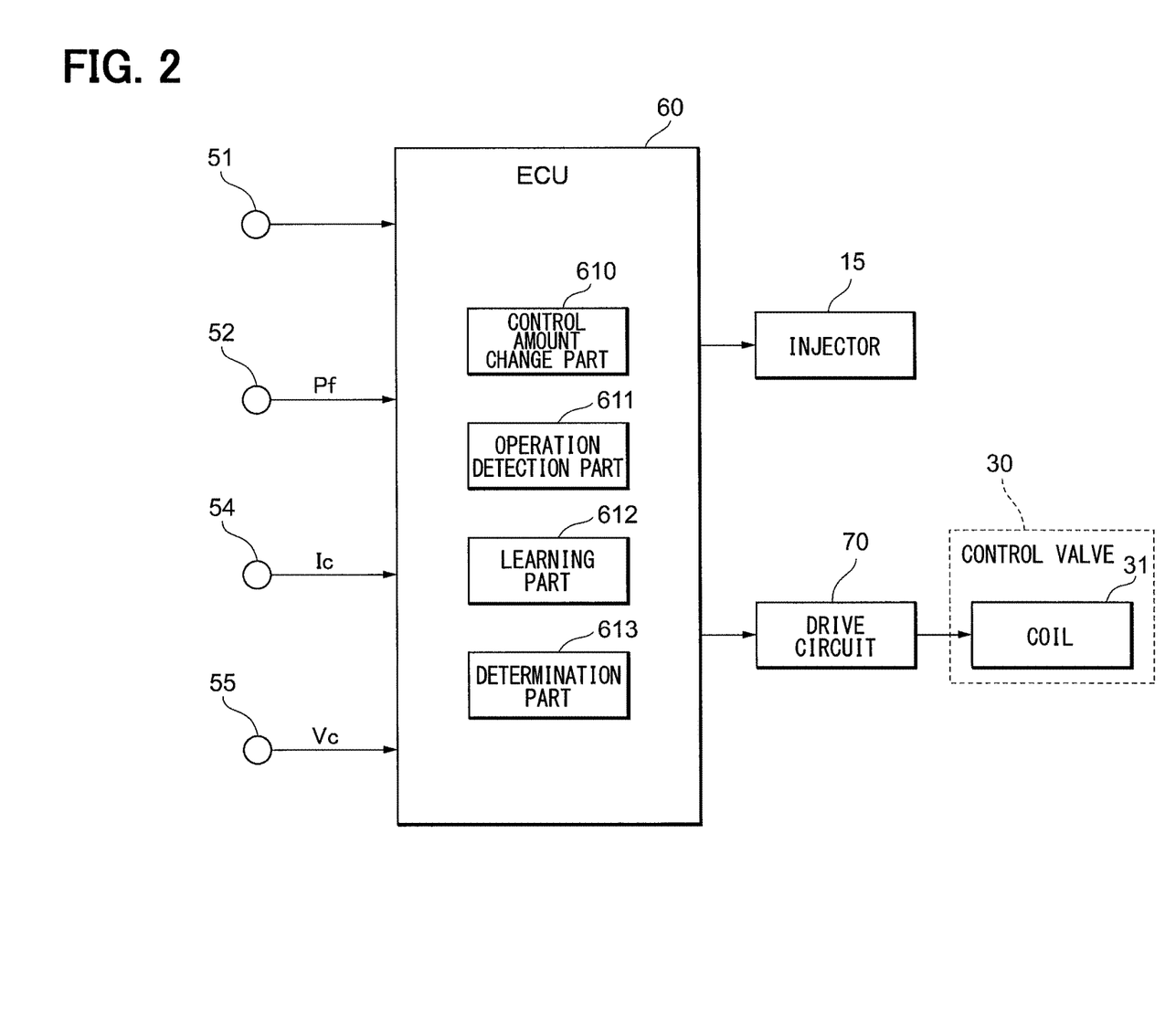
FIG. 2 is a block diagram illustrating a configuration of a control device for the high-pressure pump of the one embodiment.

The ECU 60 of the present embodiment therefore performs the noise reduction control of the high-pressure pump 20, i.e., determines whether or not the control valve 30 has operated against the energization control amount of the coil 31, and learns the energization control amount based on the determination result. Specifically, as illustrated in FIG. 2, the ECU 60 includes a control amount change part 610, an operation detection part 611, and a learning part 612.

When the high-pressure pump 20 is determined to have operated during the previous energization of the coil 31, the control amount change part 610 reduces the energization control amount in the current energization by a predetermined value. When it is determined that the high-pressure pump 20 does not operate during the previous energization, the control amount change part 610 increases the energization control amount in the current energization by a predetermined value.

When the energization control amount is changed by the control amount change part 610, the operation detection part 611 monitors the coil drive current Ic detected by the current sensor 54, and detects the operating condition of the control valve 30 based on a change in the coil drive current Ic. Specifically, the operation detection part 611 detects whether or not the control valve 30 has operated against the energization control amount.

The learning part 612 learns the energization control amount changed by the control amount change part 610 based on the detection results of the operating condition of the control valve 30 by the operation detection part 611.

Noise reduction control of the high-pressure pump 20 is now described in detail with reference to FIG. 3. In FIG.

3(A), BDC and TDC indicate the bottom dead center of and the top dead center, respectively, of the plunger 21. The drive signal of FIG. 3(B) is off during opening of the control valve 30 and on during closing of the control valve 30.

Figure 3:
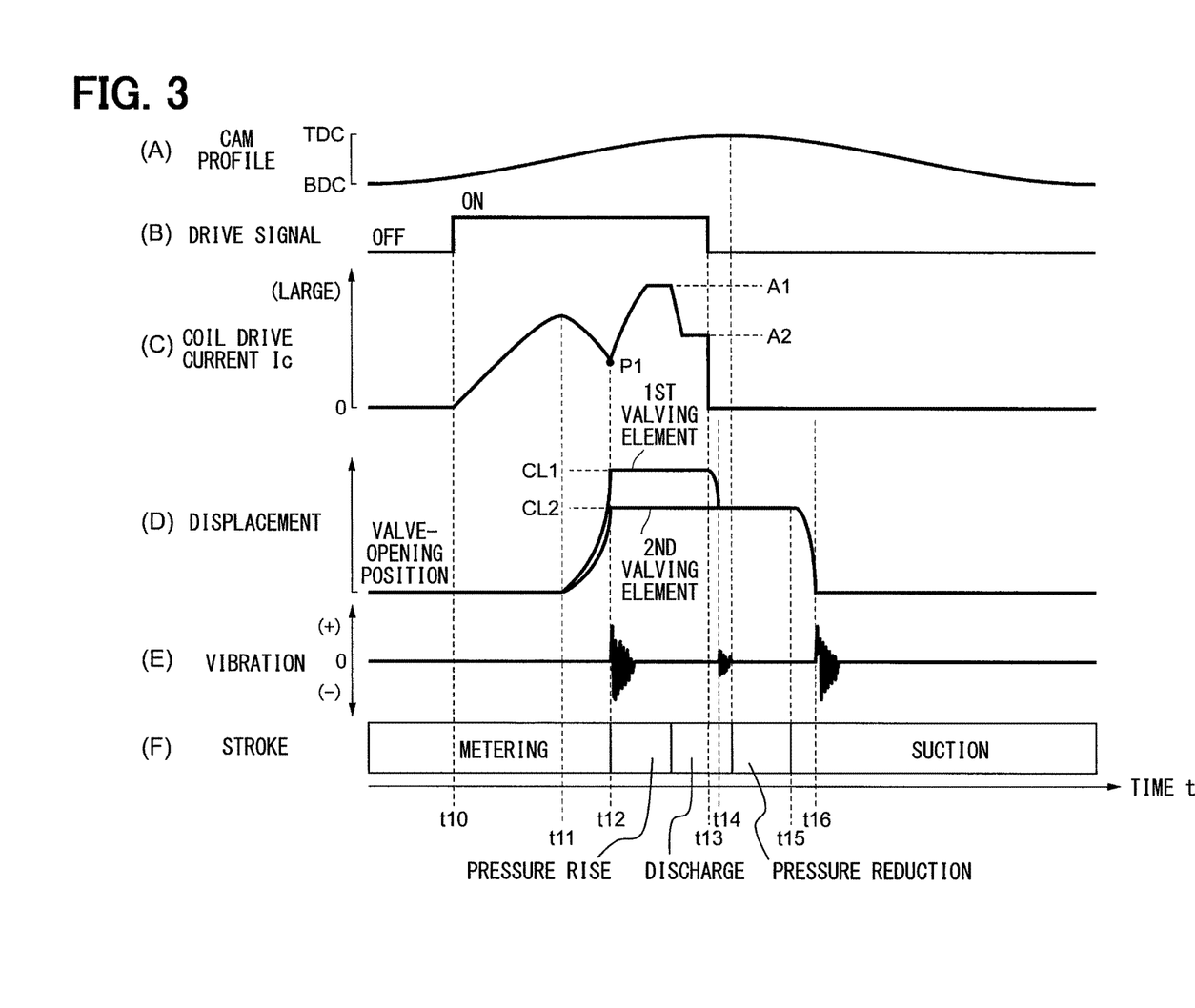
FIG. 3 is a time chart showing transition of each of a cam profile, a drive signal, a coil drive current, displacement of each of first and second valving elements, vibration of the high-pressure pump, and a stroke of the high-pressure pump when a control valve of the high-pressure pump of the one embodiment has operated.

As shown in FIG. 3(A), in a certain period, the plunger 21 moves from the top dead center to the bottom dead center along with movement of the cam 22, i.e., the plunger 21 moves toward a side such that the capacity of the pressurizing chamber 25 increases. In a period after the time t16 within the certain period, the coil 31 is non-energized as shown in FIG. 3(C). Hence, as shown in FIG. 3(D), the first valving element 32 and the second valving element 33 are each at the valve-opening position in the period after the time t16. That is, the first valving element 32 is separate from the stopper 37 by the biasing force of the spring 36. The second valving element 33 is in abutment with the stopper 39 by the first valving element 32. As a result, the pressurizing chamber 25 is in communication with the fuel suction passage 26, and the fuel is introduced into the pressurizing chamber 25. Consequently, as shown in FIG. 3(F), that period corresponds to a suction stroke of the high-pressure pump 20.

The capacity of the pressurizing chamber 25 decreases in a period where the plunger 21 moves from the bottom dead center to the top dead center. In this period, as shown in FIG. 3(B), the ECU 60 switches the drive signal from off to on at the timing corresponding to the required discharge amount of the internal combustion engine. In FIG. 3(B), the timing is time t10. That is, the ECU 60 starts energizing the coil 31 at time t10. At this time, the second valving element 33 is separate from the valve seat 40 before the time t11. Hence, the fuel in the pressurizing chamber 25 is returned toward the fuel suction passage 26 along with the movement of the plunger 21. Hence, as shown in FIG. 3(F), the period before the time t11 corresponds to a metering stroke of the high-pressure pump 20.

When the first valving element 32 is sucked toward the coil 31 with start of the energization of the coil 31, the first valving element 32 moves to an abutment position against the stopper 37. That is, as shown in FIG. 3(D), the first valving element 32 moves to the valve-closed position CL1. At this time, the first valving element 32 collides with the stopper 37, thereby vibration occurs in the high-pressure pump 20 as shown in FIG. 3(E). Energization of the coil 31 is started at time t10, and after the lapse of the predetermined time, the pressurizing chamber 25 is shut off from the fuel suction passage 26 by the second valving element 33 at time t12. The plunger 21 moves toward the top dead center in this state, thereby fuel pressure in the pressurizing chamber 25 rises, and higher-pressure fuel is produced with such fuel pressure rise and discharged toward the fuel discharge passage 27. Hence, a pressure rise stroke and a discharge stroke of the high-pressure pump 20 are performed after time t12.

Substantially, as shown in FIG. 3(B), when the ECU 60 switches the drive signal from on to off at time t13, the coil 31 is non-energized as shown in FIG. 3(C). As a result, the first valving element 32 separates from the stopper 37 and abuts on the second valving element 33 at the time t14, and as shown in FIG. 3(D), such an abutment condition continues for a predetermined period of time from time t14 to time t15. In the abutment condition, the first valving element 32 and the second valving element 33 are held at the valve-closed position CL2 of the second valving element 33. As shown in FIG. 3(E), vibration occurs in the high-pressure pump 20 due to the collision of the first valving element 32 with the second valving element 33.

Subsequently, when the plunger 21 moves from the top dead center to the bottom dead center, the pressurizing chamber 25 is increased in capacity and decreased in internal pressure. Hence, as shown in FIG. 3(F), this period corresponds to the pressure reduction stroke of the high-pressure pump 20. As a result, the fuel pressure in the second valve chest 35 is reduced, and thus the first valving element 32 and the second valving element 33 are allowed to move, and move to the respective valve-opening positions after time t15. At this time, the second valving element 33 is pressed in the axial direction by the first valving element 32 and thus collides with the stopper 39. Consequently, as shown in FIG. 3(E), vibration occurs in the high-pressure pump 20 at time t16.

As shown in FIG. 3(C), immediately after start of energization of the coil 31, the ECU 60 variably controls a duty ratio of a voltage applied to the coil 31, i.e., performs PWM control so that the coil drive current Ic increases to a first current value A1. When the coil drive current Ic increases to the first current value A1, the ECU 60 executes constant current control. In the constant current control, the ECU 60 first executes a first constant current control to hold the coil drive current Ic at the first current value A1. Subsequently, the ECU 60 shifts the control to a second constant current control with a second current value A2 smaller than the first current value A1.

When each of the first valving element 32 and the second valving element 33 moves along with energization of the coil 31, such movement is shown as a change in current flowing through the coil 31. Specifically, when the first valving element 32 starts to move, the inductance of the coil 31 increases as the first valving element 32 approaches the coil 31, so that the current flowing through the coil 31 gradually decreases. Hence, when a predetermined voltage is applied to the coil 31 from the power supply 53, the coil current increases with time until the first valving element 32 starts to move, as shown in FIG. 3(C). When the first valving element 32 starts to move from the valve-opening position at time t11, the coil drive current Ic gradually decreases as the first valving element 32 approaches the valve-closed position CL1. When the first valving element 32 abuts on the stopper 37 and thus stops movement at time t12, the inductance becomes constant again, and the coil drive current Ic increases again. That is, in the case where the first valving element 32 moves along with energization of the coil 31, and in a period where the drive signal is on, as shown in FIG. 3(C), the coil drive current Ic first shows an increasing trend and then temporarily shows a decreasing trend, and then shows an increasing trend again. As a result, a minimum value P1 is observed in the coil drive current Ic in the period where the drive signal is on.

Figure 4:
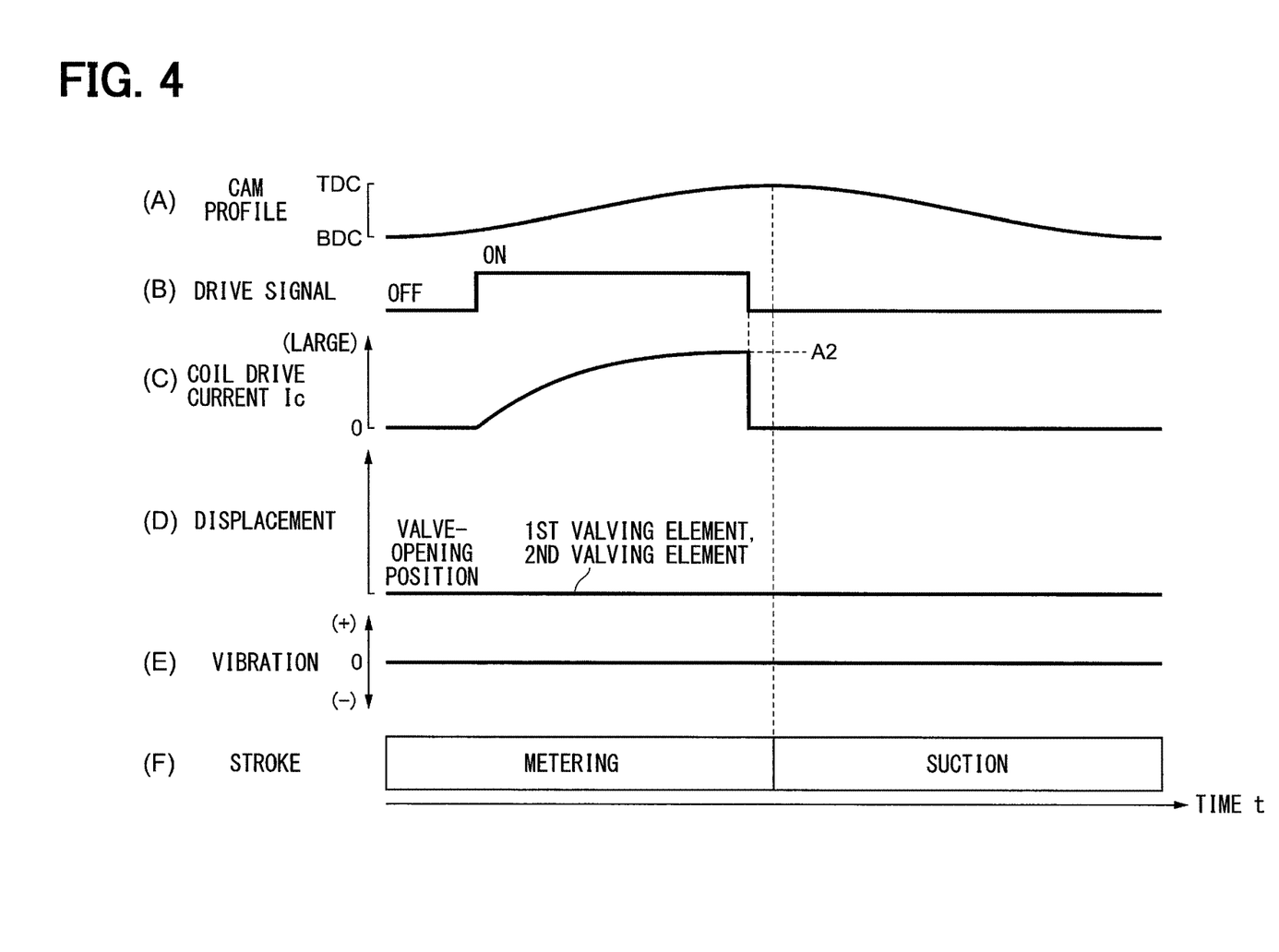
FIG. 4 is a time chart showing transition of each of the cam profile, the drive signal, the coil drive current, the displacement of each of the first and second valving elements, the vibration of the high-pressure pump, and the stroke of the high-pressure pump when the control valve of the high-pressure pump of the one embodiment does not operate.

On the other hand, when the first valving element 32 does not change from the valve-opening position despite the fact that the ECU 60 has output the drive signal for switching to valve closing to the control valve 30, the position of the first valving element 32 is held after the drive signal is output. In such a case, as shown in FIGS. 4(A) to 4(F), even if the drive signal is switched on or off, a behavior, which should be observed when the first valving element 32 and the second valving element 33 each exhibit normal movement, is not observed. Specifically, as shown in FIG. 4(C), the coil drive current Ic is not changed during the on period of the drive signal. Hence, whether or not operation of the control valve 30 is allowed can be determined based on the change in the coil drive current Ic.

Figure 5:
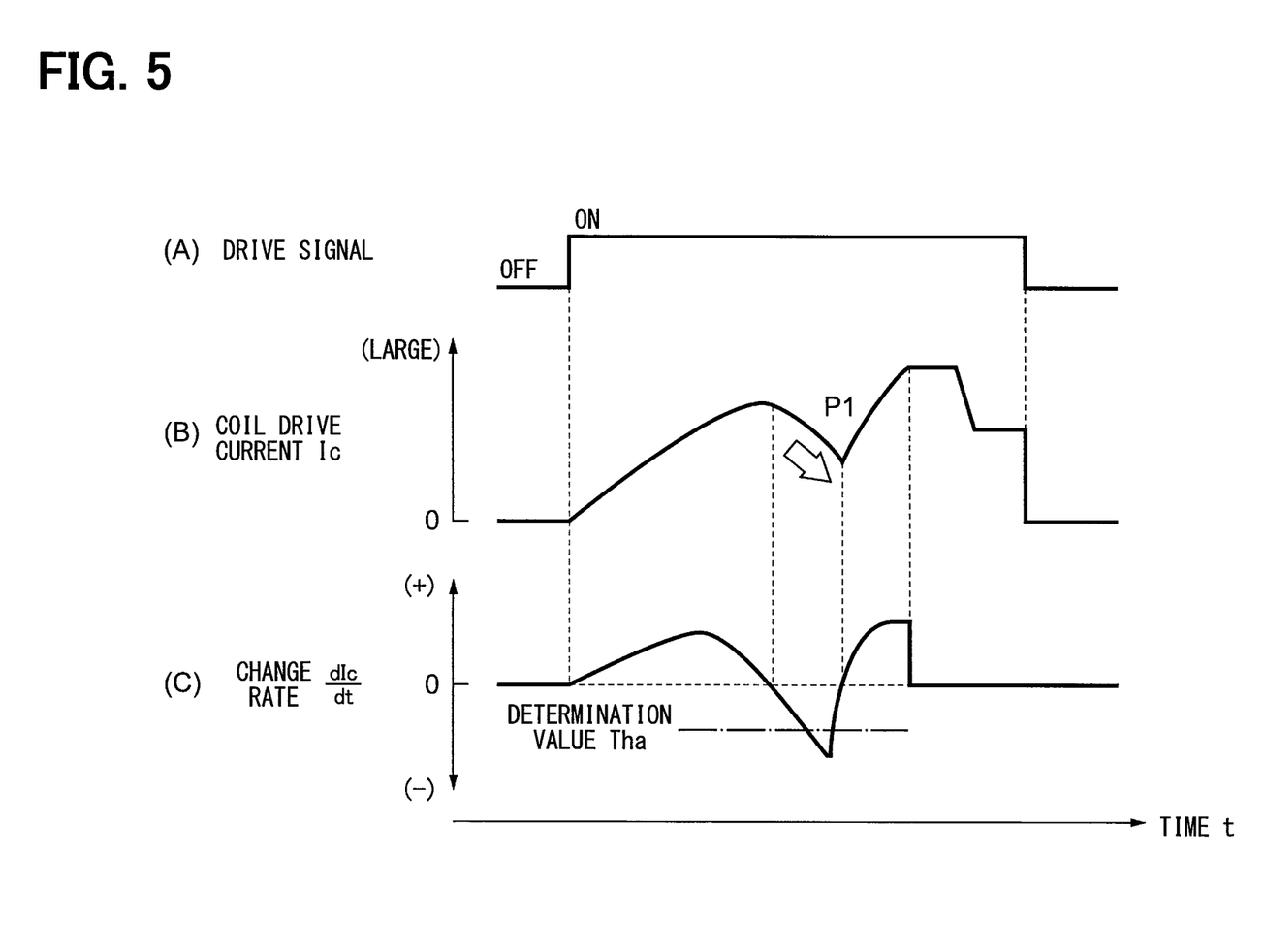
FIG. 5 is a time chart showing transition of each of the drive signal, the coil drive current, and a change rate of the coil drive current when the control valve of the high-pressure pump of the one embodiment has operated.
Figure 6:
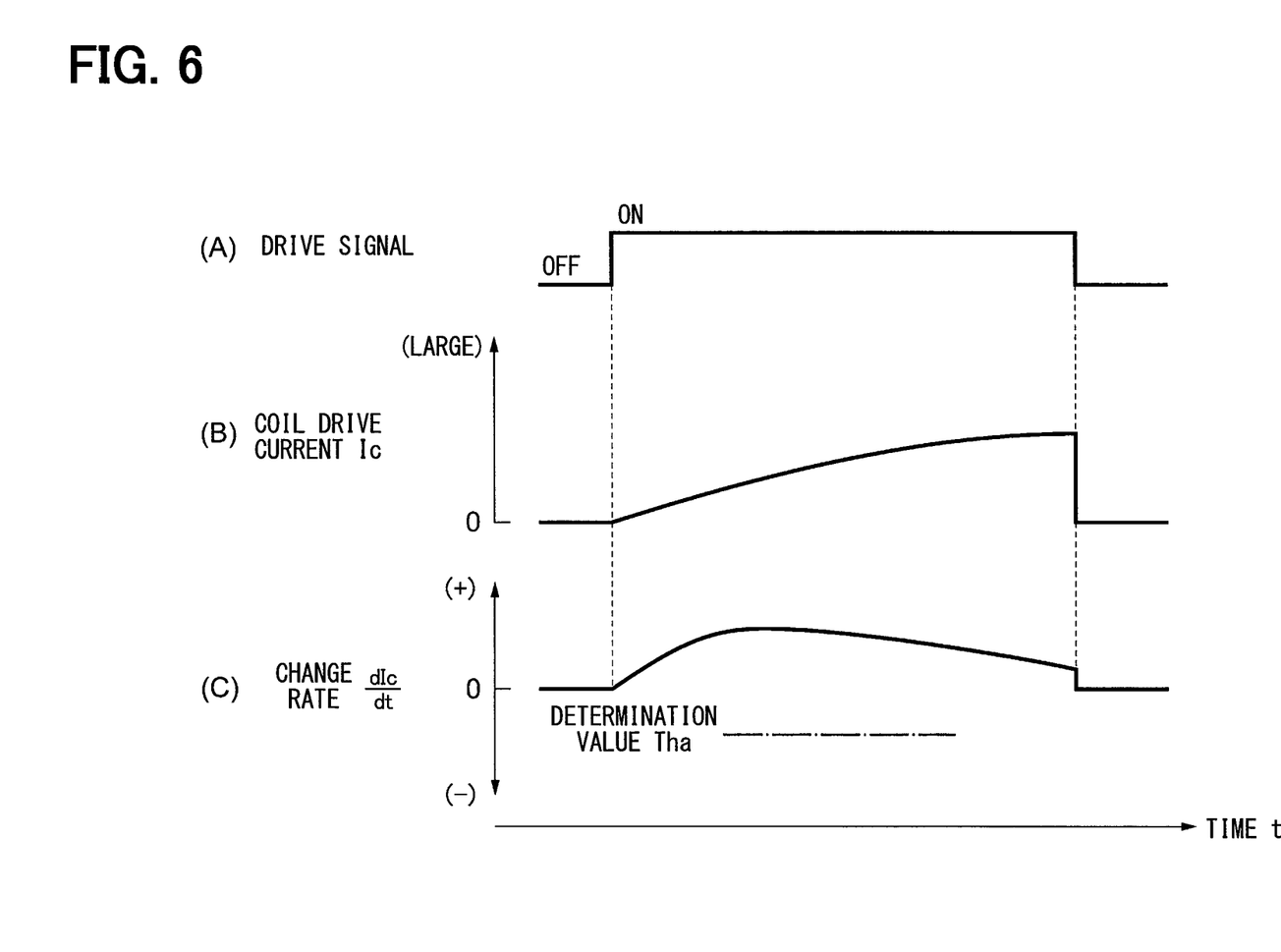
FIG. 6 is a time chart showing transition of each of the drive signal, the coil drive current, and a change rate of the coil drive current when the control valve of the high-pressure pump of the one embodiment does not operate.

FIGS. 5 and 6 are each a time chart showing a specific method of determining pump operation according to the present embodiment. The operation detection part 611 detects the operating condition of the control valve 30 based on the change rate (dIc/dt) of the coil drive current, i.e., a differential value of the coil drive current Ic.

Specifically, as shown in FIG. 5(A), when the drive signal is switched from off to on, and when the first valving element 32 moves to the valve-closed position, the coil drive current Ic shows a decreasing trend in the on period of the drive signal as shown in FIG. 5(B). Hence, as shown in FIG. 5(C), the change rate (dIc/dt) of the coil drive current changes to the negative side. On the other hand, as shown in FIG. 6(A), when the drive signal is switched from off to on, and when the first valving element 32 does not move, the coil drive current Ic does not show the decreasing trend in the on period of the drive signal as shown in FIG. 6(B). Hence, as shown in FIG. 6(C), the change rate (dIc/dt) of the coil drive current does not change to the negative side.

As shown in FIGS. 5(C) and 6(C), the operation detection part 611 uses such an operating condition and compares the change rate (dIc/dt) of the coil drive current with a determination value Tha, and detects the minimum value P1 of the coil drive current Ic on the basis that the change rate (dIc/dt) of the coil drive current is equal to or lower than the determination value Tha at the minimum value P1. When the change rate (dIc/dt) of the coil drive current is equal to or lower than the determination value Tha, the operation detection part 611 determines that the control valve 30 has operated. On the other hand, when the change rate (dIc/dt) of the coil drive current is still higher than the determination value Tha, the operation detection part 611 determines that the control valve 30 does not operate.

Figure 7:
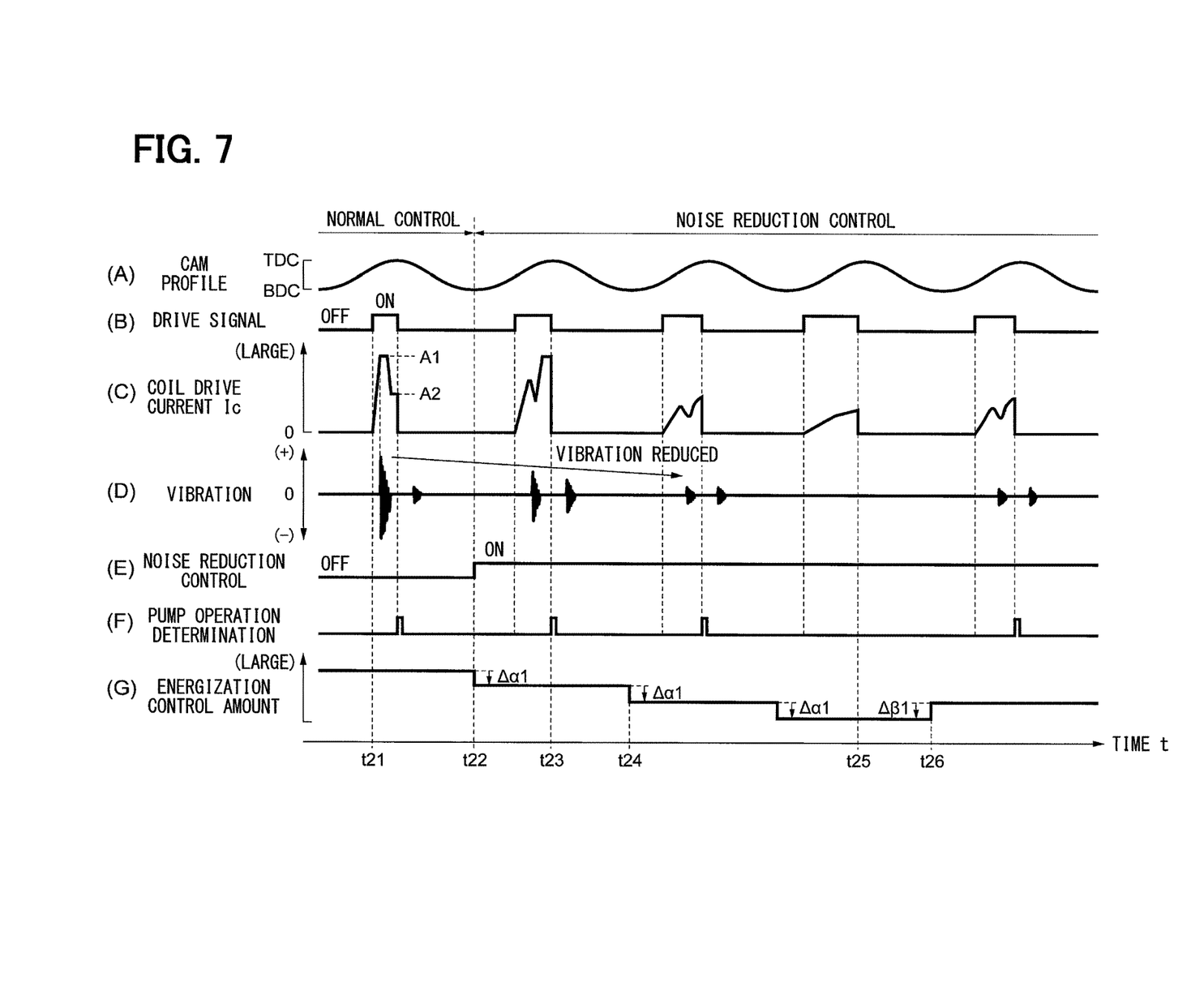
FIG. 7 is a time chart showing transition of each of the cam profile, the drive signal, the coil drive current, the vibration, execution or non-execution of noise reduction control, pump operation determination, and the energization control amount of the high-pressure pump of the one embodiment.

Summary of the noise reduction control of the high-pressure pump 20 is now described with reference to FIGS. 7(A) to 7(G).

When the normal control is executed in the discharge amount control of the high-pressure pump 20, i.e., before time t22 in FIG. 7, the ECU 60 sets the duty ratio of the voltage applied to the coil 31 to, for example, 100%. In this period, as shown in FIGS. 7(B) and 7(C), when the ECU 60 switches the drive signal from off to on at time t21, the coil drive current Ic quickly increases to the first current value A1.

The ECU 60 switches the discharge amount control of the high-pressure pump 20 from the normal control to the noise reduction control depending on the operating condition of the engine. As shown in FIG. 7(E), the normal control is switched to the noise reduction control at the timing, time t22. In the noise reduction control, a duty ratio of the voltage applied to the coil 31 is made smaller than a duty ratio in the normal control to reduce the displacement speed of the first valving element 32. For example, as shown in FIGS. 7(F) and 7(G), when operation of the control valve 30 is detected at time t23 in the previous energization control, the control amount change part 610 executes power reduction control to reduce the current energization control amount by a predetermined value $\Delta\alpha1$ from the previous energization control amount at a time point t24.

When non-operation of the control valve 30 is detected at time t25 in the previous energization control, the control amount change part 610 executes power increase control to increase the current energization control amount by a predetermined value $\beta1$ from the previous energization control amount at a time point t26.

The learning part 612 alternately repeats the power reduction control and the power increase control, thereby learns the minimum energization control amount that can move the first valving element 32 to the valve-closed position. As a result, since the first valving element 32 can be moved at the lowest possible speed within a range allowing the control valve 30 to perform the valve closing operation, vibration and operating noise can be reduced during a collision of the first valving element 32 with the stopper 37.

In the present embodiment, the change amount $\Delta\alpha1$ of the energization control amount by the power reduction control and the change amount $\Delta\beta1$ of the energization control amount by the power increase control are set to the same value. Hence, in the case where the control valve 30 does not operate when the control valve 30 is detected to operate and the energization control amount is decreased by $\Delta\alpha1$ in the previous energization, the control valve 30 basically operates again by increasing the energization control amount by $\Delta\beta1$.

In such a fuel supply system 1, the amount of fuel injected from the injector 15 decreases as compared with the normal state, for example, during idle operation or fuel cut control. When the fuel injection amount of the injector 15 decreases, operating time of the high-pressure pump 20, more specifically operating time of the control valve 30, is reduced. In such a case, since on time of the drive signal is reduced, a change in the coil drive current Ic based on the drive signal is also reduced. In other words, a change in the change rate (dIc/dt) of the coil drive current is also reduced. Hence, as shown in FIGS. 5 and 6, when the operating condition of the control valve 30 is detected based on the change in the changing rate (dIc/dt) of the coil drive current, the operation detection part 611 may not detect the change in the change rate (dIc/dt) of the coil drive current for a short drive signal. In such a case, although the control valve 30 actually operates very slightly, the operation detection part 611 cannot detect such an operating condition, and thus may erroneously detect that the control valve 30 does not operate. In such a situation, when the learning part 612 learns the energization control amount based on the detection result of the operation detection part 611, the learning part 612 cannot learn an appropriate energization control amount. As a result, the operating noise of the high-pressure pump 20 may not be reduced.

The ECU 60 of the present embodiment therefore determines whether or not an operating time of the control valve 30 for the energization control amount is shorter than the time that allows for detection of the operating condition of the control valve 30. Specifically, as shown in FIG. 2, the ECU 60 includes a determination part 613 that makes this determination. When the determination part 613 determines that the operating time of the control valve 30 for the energization control amount is shorter than the time that allows for detection of the operating condition of the control valve 30, the learning part 612 prohibits learning of the energization control amount.

A procedure of this learning process is now described in detail with reference to FIG. 8. The ECU 60 repeatedly executes the process shown in FIG. 8 at a predetermined calculation cycle.

Figure 8:
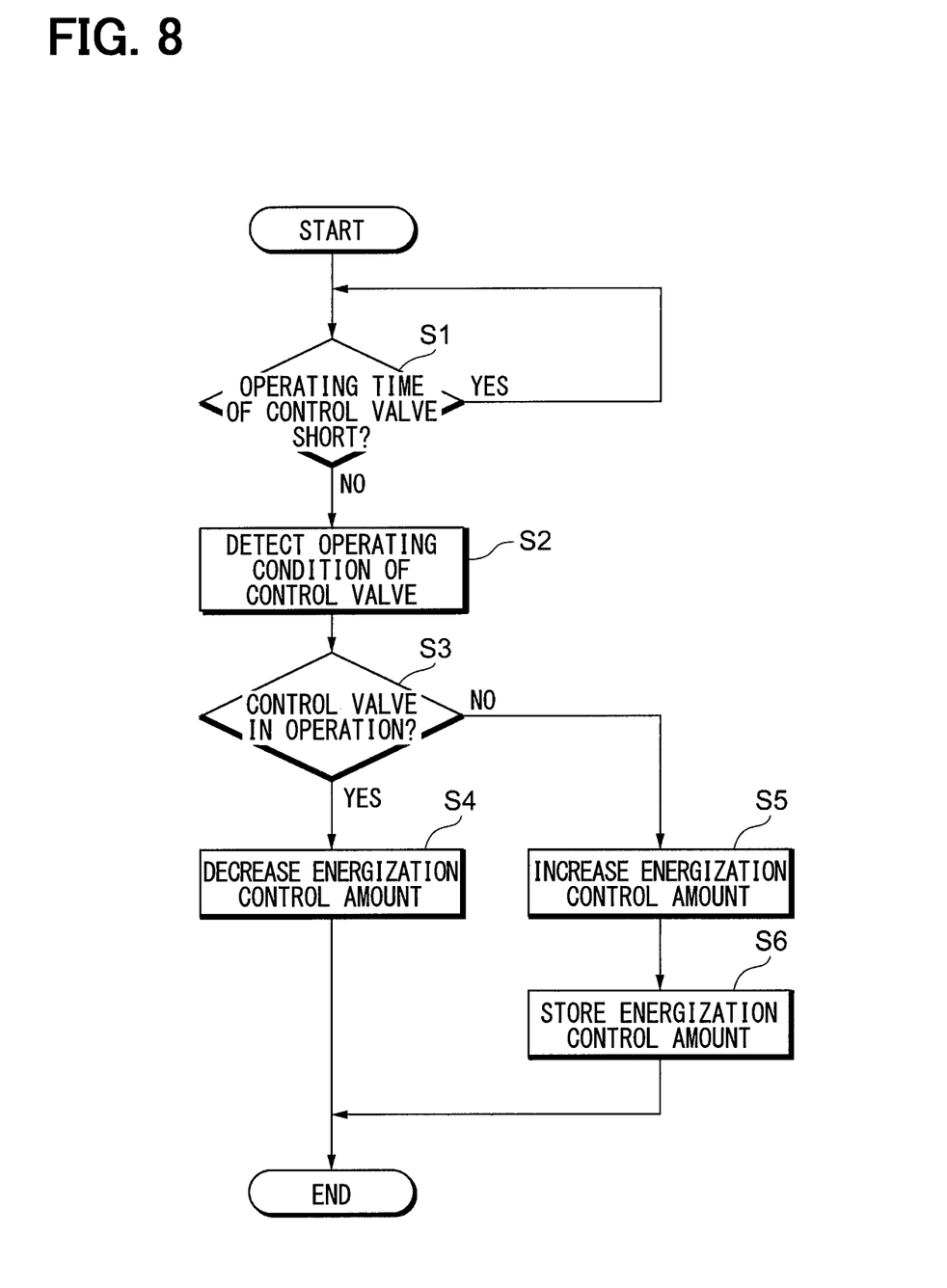
FIG. 8 is a flowchart illustrating a procedure of a process executed by ECU of the high-pressure pump of the one embodiment.

As shown in FIG. 8, the determination part 613 determines whether or not the operating time of the control valve 30 is shorter than the time that allows for detection of the operating condition of the control valve 30. The determination part 613 determines whether or not the operating time of the control valve 30 is shorter than the time that allows for detection of the operating condition of the control valve 30 based on whether the following conditions (a1) to (a5), for example, are satisfied. The determination part 613 can use one or more of the conditions (a1) to (a5). When two or more of the conditions are used, the determination part 613 may use either of logical OR and logical AND of the conditions.

(a1) A required value of the fuel discharge amount of the high-pressure pump 20 is equal to or higher than a predetermined value. This condition should be satisfied during the idle operation, for example. (a2) Fuel cut control to limit the fuel injection amount of the injector 15 is in execution. (a3) The vehicle is decelerating. (a4) The load condition of the internal combustion engine is a low load condition. (a5) The rotational speed of the crankshaft 16 is equal to or lower than a predetermined rotational speed.

When the determination part 613 makes an affirmative determination in the process of step S1, the ECU 60 does not proceed to the process of step S2. As a result, learning of the energization control amount by the learning part 612 is prohibited. When the determination part 613 makes a negative determination, the operation detection part 611 detects the operating condition of the control valve 30 as the process of step S2. Specifically, the operation detection part 611 detects the change rate (dIc/dt) of the coil drive current correlated with the operating condition of the control valve 30.

The operation detection part 611 performs a process of step S3 following step S2, i.e., determines whether or not the control valve 30 has operated. Specifically, as shown in FIGS. 5 and 6, the operation detection part 611 determines whether or not the control valve 30 has operated based on a comparison between the change rate (dIc/dt) of the coil drive current and the determination value Tha.

When the operation detection part 611 makes an affirmative determination in the process of step S3, the control amount change part 610 performs a process of step S4, i.e., decreases the energization control amount by the predetermined value $\Delta\alpha 1$.

When the operation detection part 611 makes a negative determination in the process of step S3, the control amount change part 610 performs a process of step S5, i.e., increases the energization control amount by the predetermined value $\Delta\beta 1$. Subsequently, the learning part 612 performs a process of step S6, i.e., allows the storage device of the ECU 60 to store the energization control amount increased by the predetermined value $\beta 1$ as the optimum value of the energization control amount.

According to the ECU 60 of the high-pressure pump 20 of the present embodiment as described above, the following functions and effects (1) to (3) can be given.

(1) The ECU 60 includes the control amount change part 610, the operation detection part 611, the learning part 612, and the determination part 613. The control amount change part 610 changes the energization control amount of the control valve 30. The operation detection part 611 detects the operating condition of the control valve 30 when the energization control amount is changed. The learning part 612 learns the energization control amount based on the operating condition of the control valve 30 so as to reduce the operating noise of the high-pressure pump 20. The determination part 613 determines whether or not the operating time of the control valve 30 for the energization control amount is shorter than the time that allows for detection of the operating condition of the control valve 30. When the operating time of the control valve 30 for the energization control amount is determined to be shorter than the time that allows for detection of the operating condition of the control valve 30, the learning part 612 prohibits learning. This makes it possible to avoid erroneous detection of the operating condition of the control valve 30, leading to an improvement in learning accuracy of the energization control amount. As a result, the operating noise of the high-pressure pump 20 can be reduced.

(2) The determination part 613 determines whether or not the operating time of the control valve 30 is shorter than the time that allows for detection of the operating condition of the control valve 30 based on whether the conditions (a1) to (a5) are satisfied. As a result, the determination can be easily made.

(3) The operation detection part 611 monitors the coil drive current Ic of the control valve 30, and detects whether or not the control valve 30 has operated based on a change in the coil drive current Ic. Specifically, the operation detection part 611 detects operation of the control valve 30 based on detection of the minimum value P1 of the coil drive current Ic. As a result, the operating condition of the control valve 30 can be easily detected.

The above-described embodiment can also be carried out in the following mode. Although the operation detection part 611 detects the change in the coil drive current Ic based on the change rate (dIc/dt) of the coil drive current in the above-described embodiment, the method of detecting the change in the coil drive current Ic can be appropriately modified. For example, the maximum value of the coil drive current Ic is held, and the change amount of the current measured value to the hold value is calculated during the on period of the drive signal. A change in the coil drive current Ic may be detected based on the calculated change amount.

The operation detection part 611 may detect operation of the control valve 30 based on the fact that a trend of the coil drive current Ic is changed from a decreasing trend to an increasing trend.

The operation detection part 611 may monitor the drive voltage of the control valve 30 by a voltage sensor 55 shown in FIG. 2, for example, and may detect whether or not the control valve 30 has operated based on the change in the drive voltage.

The change amount $\Delta\alpha 1$ of the energization control amount in the power reduction control and the change amount $\Delta\beta 1$ of the energization control amount in the power increase control may each be a changeable value. In addition, the change amount $\Delta\alpha 1$ may be different from the change amount $\Delta\beta 1$.

The operation detection part 611 may determine that the control valve 30 has operated based on the fact that the state, in which the change rate (dIc/dt) of the coil drive current is equal to or lower than the determination value Tha, is continued for a predetermined time.

A method of controlling drive of the control valve 30 is not limited to the method of variably controlling the duty ratio of the voltage applied to the coil 31, and may include any appropriate control method.

The high-pressure pump 20 is not limited to having two valving elements, but may have only one valving element.

The configuration of the ECU 60 of the above-described embodiment is not limitedly applied to the fuel supply system 1 of a gasoline engine, but can also be applied to a fuel supply system of a diesel engine, for example.

The ECU 60 can provide means and/or functions by software stored in a substantive storage device and a computer executing the software, software only, hardware only, or a combination thereof. For example, when the ECU 60 is provided by an electronic circuit as hardware, the ECU 60 can be provided by a digital circuit including a number of logic circuits or an analog circuit.

The present disclosure is not limited to the above-described specific examples. That is, modifications, in which design changes are appropriately made to the specific examples by those skilled in the art, are also included in the scope of the present disclosure as long as they have the features of the present disclosure. For example, the elements, the arrangement of the elements, the conditions, and the like of the specific examples are not limited to those exemplified, and can be appropriately altered or modified. In addition, the elements of the above-described embodiment can be combined as far as technically possible, and such combinations are also included in the scope of the present disclosure as long as they have the features of the present disclosure.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. A control device for a high-pressure pump, the control device adjusting a fuel discharge amount of the high-pressure pump by opening or closing a control valve through energization control, and comprising:
    a control amount change part that changes an energization control amount of the control valve;
    an operation detection part that detects an operating condition of the control valve when the energization control amount is changed;
    a learning part that learns the energization control amount based on the operating condition of the control valve to reduce an operating noise of the high-pressure pump; and
    a determination part that determines whether or not an operating time of the control valve for the energization control amount is shorter than a time that allows for the detection of the operating condition of the control valve, wherein the learning part prohibits the learning when the operating time of the control valve for the energization control amount is determined to be shorter than the time that allows for the detection of the operating condition of the control valve.

2. The control device according to claim 1, wherein the determination part determines that the operating time of the control valve for the energization control amount is shorter than the time that allows for the detection of the operating condition of the control valve when a required value for the fuel discharge amount is equal to or smaller than a predetermined value.

3. The control device according to claim 1, wherein:
    the high-pressure pump pressure-feeds fuel to an accumulator that accumulates fuel to be supplied to an injector of an internal-combustion engine of a vehicle; and
    the determination part determines that the operating time of the control valve for the energization control amount is shorter than the time that allows for the detection of the operating condition of the control valve when fuel cut control for limiting a fuel injection amount of the injector is in execution.

4. The control device according to claim 1, wherein:
    the high-pressure pump pressure-feeds fuel to an accumulator that accumulates fuel to be supplied to an injector of an internal-combustion engine of a vehicle; and
    the determination part determines that the operating time of the control valve for the energization control amount is shorter than the time that allows for the detection of the operating condition of the control valve when the vehicle is decelerating.

5. The control device according to claim 1, wherein:
    the high-pressure pump pressure-feeds fuel to an accumulator that accumulates fuel to be supplied to an injector of an internal-combustion engine of a vehicle; and
    the determination part determines that the operating time of the control valve for the energization control amount is shorter than the time that allows for the detection of the operating condition of the control valve when a load condition of the internal-combustion engine is a low load condition.

6. The control device according to claim 1, wherein the operation detection part monitors a drive current of the control valve, and detects the operating condition of the control valve based on a change of the drive current.

7. The control device according to claim 6, wherein the operation detection part determines that the control valve is in operation based on a detection of a minimum value of the drive current.

8. The control device according to claim 1, wherein the operation detection part monitors a drive voltage of the control valve, and detects the operating condition of the control valve based on a change of the drive voltage.

* * * * *